United States Patent
Kitazawa

(10) Patent No.: US 11,041,064 B2
(45) Date of Patent: Jun. 22, 2021

(54) ADDITION-CURE SILICONE COMPOSITION

(71) Applicant: SHIN-ETSU CHEMICAL CO., LTD., Tokyo (JP)

(72) Inventor: Keita Kitazawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 2 days.

(21) Appl. No.: 16/485,750

(22) PCT Filed: Feb. 9, 2018

(86) PCT No.: PCT/JP2018/004558
§ 371 (c)(1),
(2) Date: Aug. 13, 2019

(87) PCT Pub. No.: WO2018/151033
PCT Pub. Date: Aug. 23, 2018

(65) Prior Publication Data
US 2019/0359874 A1    Nov. 28, 2019

(30) Foreign Application Priority Data
Feb. 14, 2017   (JP) .............................. JP2017-024998

(51) Int. Cl.
| | | |
|---|---|---|
| C08K 9/10 | (2006.01) | |
| C08L 83/04 | (2006.01) | |
| C08G 77/08 | (2006.01) | |
| C09K 5/14 | (2006.01) | |
| B01J 35/02 | (2006.01) | |
| B01J 37/00 | (2006.01) | |
| B01J 35/00 | (2006.01) | |
| B01J 23/42 | (2006.01) | |
| B01J 33/00 | (2006.01) | |

(52) U.S. Cl.
CPC .............. C08K 9/10 (2013.01); B01J 23/42 (2013.01); B01J 33/00 (2013.01); B01J 35/0013 (2013.01); B01J 35/023 (2013.01); B01J 37/0072 (2013.01); C08G 77/08 (2013.01); C08L 83/04 (2013.01); C09K 5/14 (2013.01); C08L 2205/025 (2013.01)

(58) Field of Classification Search
CPC ................................ C08L 83/04; B01J 33/00
See application file for complete search history.

(56) References Cited

U.S. PATENT DOCUMENTS

| | | | |
|---|---|---|---|
| 4,784,879 A | 11/1988 | Lee et al. | |
| 5,017,654 A | 5/1991 | Togashi et al. | |
| 5,123,486 A * | 6/1992 | Davis | C09K 8/594 166/268 |
| 5,194,460 A * | 3/1993 | Evans | C07C 255/41 523/211 |
| 5,877,237 A | 3/1999 | Nakanishi et al. | |
| 6,040,361 A | 3/2000 | Fujiki et al. | |
| 6,383,502 B1 * | 5/2002 | Dunshee | A61K 8/31 424/401 |
| 2006/0275674 A1 * | 12/2006 | Kim | B29C 59/026 430/5 |
| 2012/0101227 A1 * | 4/2012 | Galeone | D21H 19/32 524/837 |

(Continued)

FOREIGN PATENT DOCUMENTS

| | | |
|---|---|---|
| CN | 102516930 A | 6/2012 |
| JP | 64-47442 A | 2/1989 |

(Continued)

OTHER PUBLICATIONS

"A Combined Interfacial and In-situ Polymerization Strategy to Construct Well-defined Core-shell Epoxy-containing SiO2-based Microcapsules with High Encapsulation Loading, Super Thermal Stability and Nonpolar Solvent Tolerance" authored by Jia et al. and published in the International Journal of Smart and Nano Mat.*

(Continued)

Primary Examiner — Marc S Zimmer
(74) Attorney, Agent, or Firm — Birch, Stewart, Kolasch & Birch, LLP

(57) ABSTRACT

This addition-cure silicone composition comprises (A) an organopolysiloxane that has two or more aliphatic unsaturated hydrocarbon groups per molecule and has a kinematic viscosity of 60-100,000 $mm^2/s$ at 25° C., (B) an organohydrogen polysiloxane that has two or more silicon atom-bonded hydrogen atoms per molecule, and (C) hydrosilylation catalyst particles that have a microcapsule structure in which a platinum group metal catalyst-containing organic compound or polymer compound (C') serves as a core substance, while a three-dimensional crosslinked polymer compound obtained by polymerizing at least one type of a polyfunctional monomer (C") serves as a wall substance, wherein [solubility parameter of (C")]−[solubility parameter of (C')] is at least 1.0. Since the hydrosilylation catalyst particles having a specific structure are used in this addition-curable silicone composition, it is possible to prevent the silicone composition from being cured prior to the originally intended curing process when the composition is exposed to extremely high temperature exceeding 200° C., and to maintain the activity of the hydrosilylation catalyst.

5 Claims, No Drawings

(56) References Cited

U.S. PATENT DOCUMENTS

| | | | |
|---|---|---|---|
| 2013/0287856 A1* | 10/2013 | Caprasse | A61K 9/7015 |
| | | | 424/490 |
| 2015/0246349 A1 | 9/2015 | Sutoh et al. | |
| 2017/0073518 A1* | 3/2017 | Morita | B32B 27/00 |

FOREIGN PATENT DOCUMENTS

| | | |
|---|---|---|
| JP | 2-14244 A | 1/1990 |
| JP | 4-46962 A | 2/1992 |
| JP | 4-59873 A | 2/1992 |
| JP | 7-196921 A | 8/1995 |
| JP | 11-236508 A | 8/1999 |
| JP | 2002-12768 A | 1/2002 |
| JP | 2014-24986 A | 2/2014 |
| WO | WO 2016/052521 A2 | 4/2016 |
| WO | WO 2016/133946 A1 | 8/2016 |

OTHER PUBLICATIONS

International Search Report for PCT/JP2018/004558 (PCT/ISA/210) dated May 15, 2018.
Toshinao Okitsu, "Roman and a story of adhesion (34) Development of a solubility theory", Setchaku (published by Kobunshi Kankokai) vol. 40, No. 8, pp. 342-350 (1996), total of 32 pages.
Written Opinion of the International Searching Authority for PCT/JP2018/004558 (PCT/ISA/237) dated May 15, 2018.
Supplementary European Search Report issued in Application No. 18754585.0 dated Nov. 20, 2020.
Chinese Office Action and Search Report (including an English translation thereof) issued in the corresponding Chinese Patent Application No. 201830011540.6 dated Mar. 26, 2021.
Jia et. al., "A combined interfacial and in-situ polymerization strategy to construct well-defined core-shell epoxy-containing $SiO_2$-based microcapsules with high encapsulation loading, super thermal stability and nonpolar solvent tolerance," International Journal of Smart and Nano Materials, 2016, pp. 1-15 (16 pages total including a cover page).

* cited by examiner

ADDITION-CURE SILICONE COMPOSITION

TECHNICAL FIELD

The present invention relates to an addition-curable silicone composition. More particularly, the invention relates to a hydrosilylation catalyst particle-containing addition-curable silicone composition for which, even upon exposure to very high temperatures in excess of 200° C., the rate of diffusion by the hydrosilylation catalyst into the composition is slow and there is no loss of catalytic activity.

BACKGROUND ART

Because addition-curable silicone compositions cure to form, for example, silicone gels, silicone rubbers and hard coatings having excellent electrical properties, cold resistance, heat resistance and chemical stability, they are widely used as encapsulants, fillers or coating agents for electrical/electronic components and semiconductor devices, and as insulative coatings/protective agents for optical semiconductors. By including various inorganic fillers, it is possible to increase the strength of the composition and impart heat resistance. Such compositions are also employed as heat-dissipating materials and electrically conductive materials in electronic components such as semiconductor devices and LED substrates.

Recently, however, with the advent of power device semiconductors having high operating temperatures and the now mainstream use of high melting-point lead-free solders in the packaging of electronic components, addition-curable silicone compositions employed particularly in the electrical and electronics fields are sometimes exposed to very high temperatures in excess of 200° C.

In such cases, one anticipated problem is that, in a semiconductor device packaging operation, for example, in cases where the operation passes through the sequence of a lead-free solder bonding step→an addition-curable silicone composition curing step, when the addition-curable silicone composition in an uncured state is exposed to the elevated temperature in excess of the 200° C. required for lead-free solder bonding, the curing reaction readily initiates, causing the addition-curable silicone composition to cure prior to the proper curing step. When such a curing reaction occurs, unexpected stresses may arise in the semiconductor device, leading to lethal defects in the device such as poor solder bonds.

A second anticipated problem is that of the hydrosilylation catalyst included in the addition-curable silicone composition being exposed to an elevated temperature in excess of 200° C. and undergoing a rapid loss of activity. That is, because the hydrosilylation catalyst that has been exposed to an elevated temperature in excess of 200° C. in the lead-free solder bonding step within the above semiconductor device packaging operation rapidly deactivates, the curing reaction is unable to fully proceed in the subsequent addition-curable silicone composition curing step, resulting in an insufficiently cured state for the addition-curable silicone composition and thus raising the possibility of a major loss in semiconductor device reliability.

One means for resolving the first problem is to include a suitable amount of an addition curing reaction regulator such as acetylene alcohol (Patent Document 1: JP-A H04-46962). However, when such an addition curing reaction regulators is included to a degree where curing does not arise during the lead-free solder bonding step in the above-described semiconductor device packaging operation, this has the drawback that the curing reaction fails to fully proceed even in the subsequent addition-curable silicone composition curing step, resulting in a poor cure. Moreover, including an addition curing reaction regulator is not effective as a means for preventing the second problem—deactivation of the hydrosilylation catalyst. Hence, it is difficult to resolve the two problems at the same time by merely including an addition curing reaction regulator.

A microcapsule structure wherein a hydrosilylation catalyst is embedded within a polymeric compound is conceivable as a method for simultaneously resolving the first problem, which is that the silicone composition ends up curing prior to the proper curing step, and the second problem which is deactivation of the hydrosilylation catalyst (see, for example, Patent Documents 2 and 3: JP-A H11-236508 and JP-A 2014-024986). That is, the rate of diffusion into the composition by the hydrosilylation catalyst embedded at the interior of the microcapsule structure is slow and the addition curing reaction is not readily initiated, and so it is expected that the first problem can be resolved. Also, the polymeric compound serving as the wall material buffers the heat transmitted to the hydrosilylation catalyst, and so a catalyst activity retaining effect can be expected, enabling the second problem to be resolved as well.

However, in the prior art disclosed to date, the wall material is almost always a polymeric compound having a melting point or softening point of 200° C. or less. When exposed to an elevated temperature in excess of 200° C., the hydrosilylation catalyst rapidly diffuses into the composition and thus has been unable to serve as a means for resolving both of the above problems.

PRIOR ART DOCUMENTS

Patent Documents

Patent Document 1: JP-A H04-46962
Patent Document 2: JP-A H11-236508
Patent Document 3: JP-A 2014-024986

Non-Patent Documents

Non-Patent Document 1: *Setchaku* (published by Kobunshi Kankokai) Vol. 40, No. 8, pp. 342-350 (1996)

SUMMARY OF INVENTION

Technical Problem

As mentioned above, in cases where an addition-curable silicone composition has been exposed to a very high temperature in excess of 200° C., two problems come to mind.

The first is the fact that the silicone composition will end up curing prior to the proper curing step, and the second is rapid deactivation of the hydrosilylation catalyst. One would expect a microcapsule structure wherein a hydrosilylation catalyst is embedded within a polymeric compound to be effective as a means for resolving these problems. However, the hydrosilylation catalysts having a microcapsule structure that are disclosed in the prior art, when exposed to elevated temperatures in excess of 200° C., end up rapidly diffusing within the composition, and thus have been unable to serve as a means for resolving both of the above problems.

The present invention was arrived at in view of the above circumstances. An object of the invention is to provide an addition-curable silicone composition that includes hydrosilylation catalyst particles having a microcapsule structure, which hydrosilylation catalyst, even when exposed to very high temperatures in excess of 200° C., has a slow rate of diffusion into the composition and does not lose its catalytic activity.

Solution to Problem

The inventors have conducted extensive investigations in order to achieve this object. As a result, they have discovered that, in an addition-curable silicone composition which includes an aliphatic unsaturated hydrocarbon group-containing organopolysiloxane, an organohydrogenpolysiloxane and a hydrosilylation catalyst, by using as the catalyst hydrosilylation catalyst particles which have a microcapsule structure wherein a platinum family metal complex-containing organic compound or polymeric compound (C') serves as a core material and a three-dimensional crosslinked polymeric compound obtained by polymerizing at least one type of polyfunctional monomer (C") serves as a wall material and for which [the solubility parameter of (C")]–[the solubility parameter of (C')] is 1.0 or more, the above object can be achieved. This discovery ultimately led to the present invention.

Accordingly, the invention provides the following addition-curable silicone compositions.

[1]
An addition-curable silicone composition which includes, as essential ingredients:

(A) an organopolysiloxane having at least two aliphatic unsaturated hydrocarbon groups per molecule and a kinematic viscosity at 25° C. of from 60 to 100,000 mm$^2$/s;

(B) an organohydrogenpolysiloxane having at least two silicon-bonded hydrogen atoms (SiH groups) per molecule, in an amount such that the ratio of the number of SiH groups to the total number of aliphatic unsaturated hydrocarbon groups in component (A) is from 0.5 to 5; and (C) an effective amount of hydrosilylation catalyst particles that have a microcapsule structure in which a platinum family metal catalyst-containing organic compound or polymeric compound (C') serves as a core material and a three-dimensional crosslinked polymeric compound obtained by polymerizing at least one type of polyfunctional monomer (C") serves as a wall material and for which [the solubility parameter of (C")]–[the solubility parameter of (C')] is 1.0 or more.

[2]
The addition-curable silicone composition of [1], wherein component (C) has an average particle size of from 0.01 to 1,000 μm.

[3]
The addition-curable silicone composition of [1] or [2], wherein the polyfunctional monomer (C") in component (C) is a polyfunctional monomer having two or more polymerizable carbon-carbon double bonds per molecule.

[4]
The addition-curable silicone composition of [3], wherein the polyfunctional monomer (C") in component (C) is a polyfunctional monomer having two or more (meth)acrylic groups per molecule.

[5]
The addition-curable silicone composition of any of [1] to [4], further including: (D) an effective amount of one or more addition curing reaction regulator selected from the group consisting of acetylene compounds, nitrogen compounds, organophosphorus compounds, oxime compounds and organochloro compounds.

[6]
The addition-curable silicone composition of any of [1] to [5], further including: (E) from 0.1 to 5,000 parts by weight, per 100 parts by weight of component (A), of at least one inorganic filler selected from the group consisting of metals, metal oxides, metal hydroxides, metal nitrides, metal carbides and carbon allotropes.

Advantageous Effects of Invention

By employing hydrosilylation catalyst particles having a specific microcapsule structure, the addition-curable silicone composition of the invention, when exposed to very high temperatures in excess of 200° C., can prevent the silicone composition from curing prior to the proper curing step and at the same time can maintain the activity of the hydrosilylation catalyst.

DESCRIPTION OF EMBODIMENTS

The invention is described in detail below.
Component (A)

Component (A) is an organopolysiloxane having at least two, preferably from 2 to 100, and more preferably from 2 to 50, aliphatic unsaturated hydrocarbon groups per molecule and a kinematic viscosity at 25° C. of from 60 to 100,000 mm$^2$/s.

The aliphatic unsaturated hydrocarbon groups are preferably monovalent hydrocarbon groups of from 2 to 8 carbon atoms, especially from 2 to 6 carbon atoms, which have an aliphatic unsaturated bond, and are more preferably alkenyl groups. Illustrative examples include alkenyl groups such as the vinyl, allyl, propenyl, isopropenyl, butenyl, hexenyl, cyclohexenyl and octenyl groups. Vinyl groups are especially preferred. The aliphatic unsaturated hydrocarbon groups may be bonded either to silicon atoms at the ends of the molecular chain or to silicon atoms partway along the molecular chain, or may be bonded to both.

Organic groups other than the aliphatic unsaturated hydrocarbon groups bonded to silicon atoms on the organopolysiloxane include substituted or unsubstituted monovalent hydrocarbon groups of from 1 to 18 carbon atoms, preferably from 1 to 10 carbon atoms, and more preferably from 1 to 8 carbon atoms. Illustrative examples include alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl and naphthyl groups; aralkyl groups such as benzyl, phenylethyl and phenylpropyl groups; and any of these groups in which some or all hydrogen atoms are substituted with halogen atoms such as fluorine, bromine or chlorine, cyano groups or the like, such as chloromethyl, chloropropyl, bromoethyl, trifluoropropyl and cyanoethyl groups. Methyl groups are especially preferred.

The organopolysiloxane has a kinematic viscosity at 25° C. of from 60 to 100,000 mm$^2$/s, and preferably from 100 to 30,000 mm$^2$/s. At a kinematic viscosity below 60 mm$^2$/s, the physical characteristics of the silicone composition may decrease. At a kinematic viscosity greater than 100,000 mm$^2$/s, the silicone composition may have a poor extensibility. In this invention, the kinematic viscosity is a value measured at 25° C. with an Ubbelohde-type Ostwald viscometer.

The organopolysiloxane, so long as it has the above properties, is not particularly limited as to its molecular structure, which may be, for example, linear, branched, or linear with a partially branched or cyclic structure. In particular, it is preferable for the backbone to consist of repeating diorganosiloxane units and for both ends of the molecular chain to have a linear structure capped with triorganosiloxy groups. This organopolysiloxane having a linear structure may in places have branched structures or cyclic structures.

The organopolysiloxane may be of one type used alone, or two or more types may be used in combination.

Component (B)

Component (B) is an organohydrogenpolysiloxane having at least 2, preferably at least 3, more preferably from 3 to 100, and even more preferably from 3 to 20, silicon-bonded hydrogen atoms (SiH groups) per molecule. The organohydrogenpolysiloxane should be one which is capable of forming a crosslinked structure by the addition reaction of SiH groups on the molecule with aliphatic unsaturated hydrocarbon groups on above-described component (A) in the presence of a platinum family metal catalyst.

The silicon-bonded organic groups on the organohydrogenpolysiloxane are exemplified by monovalent hydrocarbon groups other than aliphatic unsaturated hydrocarbon groups. Substituted or unsubstituted monovalent hydrocarbon groups of 1 to 12 carbon atoms, and preferably 1 to 10 carbon atoms, are especially preferred. Illustrative examples include alkyl groups such as methyl, ethyl, propyl, butyl, hexyl and dodecyl groups; aryl groups such as phenyl groups; aralkyl groups such as 2-phenylethyl and 2-phenylpropyl groups; any of these groups in which some or all hydrogen atoms are substituted with halogen atoms such as fluorine, bromine or chlorine, or cyano groups, examples of which include chloromethyl, chloropropyl, bromoethyl, trifluoropropyl and cyanoethyl groups; and also epoxy ring-containing organic groups (glycidyl- or glycidyloxy-substituted alkyl groups) such as 2-glycidoxyethyl, 3-glycidoxypropyl and 4-glycidoxybutyl groups.

The organohydrogenpolysiloxane, so long as it has the above properties, is not particularly limited as to its molecular structure, which may be, for example, linear, branched, cyclic, or linear with a partially branched or cyclic structure. The structure is preferably linear or cyclic.

The organohydrogenpolysiloxane has a kinematic viscosity at 25° C. which is from 1 to 1,000 mm$^2$/s, and preferably from 10 to 100 mm$^2$/s. At a kinematic viscosity of 1 mm$^2$/s or more, there is no risk of decreases in the physical properties of the silicone composition; at a kinematic viscosity of 1,000 mm$^2$/s or less, there is no risk of the silicone composition having a poor extensibility.

The organohydrogenpolysiloxane may be of one type used singly or two or more types may be used in admixture.

The organohydrogenpolysiloxane serving as component (B) is included in an amount such that the ratio of the number of SiH groups in component (B) to the total number of aliphatic unsaturated hydrocarbon groups in component (A) is from 0.5 to 5, preferably from 0.8 to 3, and more preferably from 1 to 2.5. At an amount of component (B) below this lower limit, the addition reaction does not fully proceed and crosslinking is inadequate. At an amount greater than this upper limit, the crosslinked structure becomes non-uniform or the shelf stability of the composition markedly worsens.

Component (C)

Component (C) is hydrosilylation catalyst particles which have a microcapsule structure wherein a platinum family metal catalyst-containing organic compound or polymeric compound (C') serves as a core material and a three-dimensional crosslinked polymer compound obtained by polymerizing at least one type of polyfunctional monomer (C") serves as a wall material.

The platinum family metal catalyst may be one that is hitherto known and can be used in addition reactions. Examples include platinum-based, palladium-based, rhodium-based, ruthenium-based, osmium-based and iridium-based catalysts. Of these, platinum or platinum compounds, which are relatively easily available, are preferred. Examples include uncombined platinum, platinum black, chloroplatinic acid, platinum-olefin complexes, platinum-alcohol complexes and platinum coordination compounds. The platinum family metal catalyst may be of one type used alone or two or more types may be used in combination.

The platinum family metal catalyst is preferably in an organic compound or polymeric compound (C')-diluted state. Examples of the organic compound include aliphatic hydrocarbons such as pentane, hexane and heptane; alicyclic hydrocarbons such as cyclopentane, cyclohexane and cycloheptane; aromatic hydrocarbons such as benzene, toluene, xylene and mesitylene; alcohols such as methanol, ethanol, propanol, butanol, ethylene glycol and glycerol; ethers such as diethyl ether, tetrahydrofuran and dioxane; esters such as ethyl acetate and butyl acetate; halogenated hydrocarbons such as dichloromethane and chloroform; aprotic polar compounds such as N,N-dimethylformamide and N-methylpyrrolidone; and cyclic siloxane compounds such as octamethylcyclotetrasiloxane and decamethylcyclopentasiloxane. Examples of the polymeric compound include hydrocarbon-based polymeric compounds such as polybutadiene, polyisoprene and polyisobutylene; and various types of liquid organopolysiloxane compounds, including those having dimethyl, methyl-phenyl or fluoro groups. These organic compounds and polymeric compounds may be of one type used alone or two or more types may be used in combination.

A known compound may be used as the polyfunctional monomer (C") serving as the precursor of the three-dimensional crosslinked polymeric compound that forms the wall material of the microcapsule structure, although a polyfunctional monomer having two or more polymerizable carbon-carbon double bonds per molecule is preferred. Examples include polyfunctional acrylates such as 1,6-hexanediol diacrylate, 1,10-decanediol diacrylate, trimethylolpropane triacrylate and pentaerythritol tetraacrylate; polyfunctional methacrylates such as 1,4-butanediol dimethacrylate, 1,6-hexanediol dimethacrylate, ethylene glycol dimethacrylate, diethylene glycol dimethacrylate, triethylene glycol dimethacrylate, glycerol dimethacrylate and trimethylolpropane trimethacrylate; polyfunctional acrylamides such as N,N'-methylenebisacrylamide, N,N'-ethylenebisacrylamide and N,N'-(1,2-dihydroxyethylene)bisacrylamide; polyfunctional methacrylamides such as N,N'-methylenebismethacrylamide; and divinylbenzene. Of these, polyfunctional monomers having two or more (meth)acrylic groups per molecule are preferred; polyfunctional acrylates and polyfunctional methacrylates, which are relatively easily available and have a high polymerizability, are more preferred. These polyfunctional monomers may be of one type used alone or two or more types may be used in combination.

Known methods may be used without particular limitation as the method for producing the hydrosilylation catalyst particles composed of a platinum family metal catalyst-containing organic compound or polymeric compound as the core material and a three-dimensional crosslinked polymeric compound as the wall material. For example, interfacial polymerization or in-situ polymerization may be used. The polymerization reaction can be accelerated by heating or ultraviolet light irradiation, and a thermal polymerization initiator or a photopolymerization initiator may be concomitantly used.

An example of a process for producing the hydrosilylation catalyst particles of the invention is described below.

First, a dispersion is prepared by dispersing a mixture of a platinum family metal catalyst-containing organic compound or polymeric compound, a polyfunctional monomer and a photopolymerization initiator in a dispersion medium. Here, examples of the photopolymerization initiator include diphenyl(2,4,6-trimethylbenzoyl)phosphine oxide, phenylbis(2,4,6-trimethylbenzoyl)phosphine oxide, 2-hydroxy-2-phenylacetophenone, 2,2-dimethoxy-2-phenylacetophenone, 1-hydroxycyclohexylphenyl ketone and 2-benzyl-2-(dimethylamino)-4'-morpholinobutyrophenone. Examples of the dispersion medium include water and mixtures obtained by adding to water a water-soluble organic solvent such as methanol or ethanol. The dispersion medium may include an optional dispersant, examples of which include alkyl sulfates and sulfonates, alkylbenzene sulfonates, triethanolamine alkyl sulfates, polyoxyethylene alkyl ethers and polyvinyl alcohols.

By then irradiating the prepared dispersion with ultraviolet light, the polyfunctional monomer is polymerized, forming a three-dimensional crosslinked polymeric compound that serves as the wall material, thereby obtaining hydrosilylation catalyst particles having a microcapsule structure.

Component (C) is hydrosilylation catalyst particles characterized by having a microcapsule structure in which a platinum family metal catalyst-containing organic compound or polymeric compound (C') serves as the core material and a three-dimensional crosslinked polymeric compound obtained by polymerizing at least one type of polyfunctional monomer (C") serves as the wall material, and by the fact that, even when the composition is exposed to a very high temperature in excess of 200° C., the rate of diffusion by the hydrosilylation catalyst into the composition is slow and the catalytic activity is not lost. In order for the rate of diffusion by the hydrosilylation catalyst into the composition to be slow and in order for the catalytic activity to not be lost even when the composition has been exposed to a very high temperature in excess of 200° C., it is preferable for the particles to have a core-shell structure wherein the core material and the wall material in the microcapsule structure are clearly separated. To this end, it is advantageous to lower the compatibility between the platinum family metal catalyst-containing organic compound or polymeric compound (C') serving as the core material and the at least one type of polyfunctional monomer (C") which is the precursor for the three-dimensional crosslinked polymeric compound serving as the wall material. By thus lowering the compatibility between the organic compound or polymeric compound (C') and the polyfunctional monomer (C"), phase separation between the two is promoted. As a result, following polymerization of the polyfunctional monomer, hydrosilylation catalyst particles having a core-shell structure in which the core material and the wall material are clearly separated can be obtained. More specifically, [the solubility parameter of the polyfunctional monomer (C")]−[the solubility parameter of the organic compound or polymeric compound (C')] is at least 1.0, preferably at least 1.5 and not more than 10, and more preferably at least 1.8 and not more than 8. When [the solubility parameter of the polyfunctional monomer (C")]−[the solubility parameter of organic compound or polymeric compound (C')] is less than 1.0, phase separation of the organic compound or polymeric compound (C') and the polyfunctional monomer (C") has difficulty arising, as a result of which the core-shell structure of the resulting hydrosilylation catalyst particles is indistinct and, when the composition has been exposed to a very high temperature in excess of 200° C., the rate of diffusion of the hydrosilylation catalyst into the composition speeds up, the addition curing reaction accelerates, and the catalytic activity is readily lost.

In this specification, the solubility parameter δ refers to values calculated by formula (1) below using the molar attraction constants ΔF for various atomic groups according to T. Okitsu shown in Table 1 below and cited in Non-Patent Document 1: *Setchaku* (published by Kobunshi Kankokai) Vol. 40, No. 8, pp. 342-350 (1996), and their densities d and gram molecular weights M.

$$(\text{solubility parameter } \delta) = d \times \Sigma \Delta F / M \quad (1)$$

Also, the solubility parameter $\delta_{mix}$ for the mixture is expressed as the sum of the respective solubility parameters δ multiplied by the respective volume fractions φ.

$$\text{Solubility parameter } \delta_{mix} \text{ for mixture} = \phi_1 \times \delta_1 + \phi_2 \times \delta_2 + \ldots + \phi_n \times \delta_n \quad (2)$$

(where $\phi_1 + \phi_2 + \ldots + \phi_n = 1$)

TABLE 1

| Groups | Okitsu's ΔF | Okitsu's Δv | Groups | Okitsu's ΔF | Okitsu's Δv | Groups | Okitsu's ΔF | Okitsu's Δv |
|---|---|---|---|---|---|---|---|---|
| —CH$_3$ | 205 | 31.8 | —OH(Diol) | 270 | 12.0 | —SH | 310 | 28.0 |
| —CH$_2$— | 132 | 16.5 | —OH(Arom) | 238 | 12.0 | >SO$_2$ | 675 | 11.4 |
| >CH— | 28.6 | −1.0 | —NH$_2$ | 273 | 16.5 | >S=O | 485 | 11.4 |
| >CH—(Poly) | 28.6 | 1.9 | —NH$_2$(Arom) | 238 | 21.0 | —S— | 201 | 12.0 |
| >C< | −81 | 14.8 | —NH— | 180 | 8.5 | S= | 201 | 23.0 |
| >C<(Poly) | −81 | 19.2 | —NH—(Link) | 180 | 4.0 | SO$_3$ | 322 | 27.5 |
| CH$_2$= | 195 | 31.0 | —N< | 61.0 | −9.0 | SO$_4$ | 465 | 31.8 |
| —CH= | 116 | 13.7 | —N= | 118 | 5.0 | >Si< | 16.3 | 0 |
| >C= | 24.2 | −2.4 | —N=(Link) | 118 | 15.0 | PO$_4$ | 374 | 28.0 |
| =C= | 200 | 23.0 | —CN | 420 | 23.0 | H | 81 | 8.0 |
| —C≡ | 100 | 6.5 | —CN(Arom) | 252 | 27.0 | —C$_6$H$_5$(Arom) | 731 | 72.0 |
| —O— | 120 | 5.1 | —CN(Poly) | 420 | 27.0 | —C$_6$H$_4$(Arom) | 655 | 62.0 |
| —O—(Arom, Lin) | 70 | 3.8 | —NO$_2$ | 481 | 24.0 | —C$_6$H$_3$(Arom) | 550 | 39.0 |
| —O—(Epoxy) | 176 | 5.1 | —NO$_2$(Arom) | 342 | 32.0 | —C$_6$H$_2$(Arom) | 450 | 27.0 |
| —CO— | 286 | 10.0 | —NCO | 498 | 35.0 | —C$_5$H$_5$(Poly) | 731 | 79.0 |
| —COOH | 373 | 24.4 | —NHCO— | 690 | 18.5 | —C$_6$H$_4$(Poly) | 655 | 69.0 |
| —COOH(Arom) | 242 | 24.4 | >NHCO— | 441 | 5.4 | —C$_6$H$_3$(Poly) | 550 | 47.0 |
| —COO— | 353 | 19.6 | —CL(Mono) | 330 | 23.0 | —C$_6$H$_2$(Poly) | 450 | 32.0 |
| —COO—(Poly) | 330 | 22.0 | —CL(Di) | 250 | 25.0 | -(Cyclohexyl) | 790 | 97.5 |

TABLE 1-continued

| Groups | Okitsu's ΔF | Δv | Groups | Okitsu's ΔF | Δv | Groups | Okitsu's ΔF | Δv |
|---|---|---|---|---|---|---|---|---|
| —O—CO—O— | 526 | 20.0 | —CL(Tri, Tetra) | 235 | 27.0 | (Plus onto upper groups) | | |
| —CHO | 370 | 25.0 | —CL(Arom) | 235 | 27.0 | 3 Member 1 in | +110 | +18 |
| —CHO(Arom) | 213 | 29.0 | —CL(>C<) | 235 | 28.0 | 4 Member 1 in | +110 | +18 |
| —OH(Mono) | 395 | 10.0 | —CL(Poly) | 270 | 27.0 | 5 Member 1 in | +110 | +16 |
| —OH(Ether) | 342 | 12.0 | —Br(mean) | 302 | 30.0 | 6 Member 1 in | +100 | +16 |
| —OH(H$_2$O) | 342 | 12.0 | —F(Mean) | 130 | 19.0 | Conjugated | +30 | −22 |
| —OH(Poly) | 282 | 17.0 | —F(Poly) | 110 | 21.0 | Double bond Ditto(Link) | +30 | −10 |

Note:
(Poly) = Polymer;
(Arom) = Aromatic;
(Lin) = Link

The hydrosilylation catalyst particles having a microcapsule structure of component (C) include within the structure the platinum family metal catalyst in an amount, expressed in terms of the platinum family metal atom content within the platinum family metal catalyst, of preferably from 0.01 to 10 wt %, more preferably from 0.05 to 5 wt %, and even more preferably from 0.1 to 3 wt %. This platinum family metal atom content can be measured using an inductively coupled plasma-optical emission spectrometer (ICP-OES) (Agilent 730, from Agilent Technologies).

The content of the organic compound or polymeric compound (C') in the hydrosilylation catalyst particles serving as component (C) is preferably from 1 to 80 wt %, more preferably from 3 to 70 wt %, and even more preferably from 5 to 50 wt %.

The content of the three-dimensional crosslinked polymeric compound obtained by polymerizing at least one type of polyfunctional monomer (C") within the hydrosilylation catalyst particles serving as component (C) is preferably from 10 to 95 wt %, more preferably from 20 to 90 wt %, and even more preferably from 30 to 80 wt %.

These can be measured by simultaneous differential thermal analysis and thermogravimetry (TG/DTA 7200, from SII NanoTechnology Inc.).

The average particle size of component (C) is preferably in the range of 0.01 to 1,000 μm, more preferably in the range of 0.05 to 500 μm, and even more preferably in the range of 0.1 to 100 μm. When smaller than 0.01 μm, the hydrosilylation catalyst particles themselves tend to agglomerate, as a result of which the dispersibility in the addition-curable silicone composition may decrease. At an average particle size larger than 1,000 μm, when the addition-curable silicone composition is heat-cured, the dispersibility of the platinum family metal catalyst decreases and uniform curing of the composition may become difficult. The average particle size can be determined as the mass mean value (or median diameter) in particle size distribution measurement by, for example, a laser diffraction method.

The hydrosilylation catalyst particles serving as component (C) may be of one type used alone or two or more types may be used in admixture.

The content of component (C) may be an amount that is effective as a catalyst; that is, an effective amount necessary for promoting the addition reaction and curing the addition-curable silicone composition of the invention. In particular, the amount with respect to component (A), expressed in terms of weight based on the platinum family metal atoms, is preferably from 0.1 to 500 ppm, and more preferably from 1 to 200 ppm. At a catalyst amount smaller than this lower limit value, advantageous effects as a catalyst may not be obtained. A catalyst amount greater than this upper limit value provides no further increase in the catalytic effects, and thus is undesirable because it is not economical.

Component (D)

The addition-curable silicone composition of the invention may additionally include, as component (D), an addition curing reaction regulator. The addition curing reaction regulator functions to keep the hydrosilylation reaction from proceeding at room temperature, thus extending the shelf life and pot life of the composition. Hitherto known regulators that are used in addition-curable silicone compositions may be used as this addition curing reaction regulator. Illustrative examples include acetylene compounds such as acetylene alcohols (e.g., ethynyl methyl decyl carbinol, 1-ethynyl-1-cyclohexanol, 3,5-dimethyl-1-hexyn-3-ol), various nitrogen compounds such as tributylamine, tetramethylethylenediamine and benzotriazole, organophosphorus compounds such as triphenylphosphine, oxime compounds and organochloro compounds. One such compound may be used alone, or two or more types may be used in admixture.

The amount of component (D) may be set to an effective amount. In particular, this amount is preferably from 0.05 to 1.0 part by weight, and more preferably from 0.1 to 0.8 part by weight, per 100 parts by weight of component (A). At an amount of regulator that is 0.05 part by weight or more, the satisfactory shelf life and pot life that are desired can be obtained. An amount which is 1.0 part by weight or less is desirable because there is no risk of a decrease in the curability of the silicone composition.

The addition curing reaction regulator may be diluted with an organo(poly)siloxane, toluene or the like in order to improve dispersibility in the silicone composition.

Component (E)

The addition-curable silicone composition may further include, as component (E), an inorganic filler. The organic filler serving as component (E) is for imparting various properties, such as heat conductivity, heat resistance, reinforcing properties and electrical conductivity, to the addition-curable silicone composition of the invention. It is preferably composed of at least one type of material selected from the group consisting of metals, metal oxides, metal hydroxides, metal nitrides, metal carbides and carbon allotropes. Illustrative examples include aluminum, silver, copper, metallic silicon, alumina, zinc oxide, magnesium oxide, silicon dioxide, cerium oxide, iron oxide, aluminum hydroxide, cerium hydroxide, aluminum nitride, boron nitride, silicon carbide, diamond, graphite, carbon nanotubes and graphene. The use of aluminum, alumina, zinc oxide or boron nitride is preferred for imparting heat conductivity to the composition; the use of cerium oxide, cerium hydroxide or iron oxide is preferred for imparting heat resistance; the use of silicon dioxide is preferred for imparting reinforcing properties; and the use of silver or copper is preferred for imparting electrical conductivity.

Because the resulting composition may become non-uniform when the inorganic filler has an average particle size that is larger than 500 μm, the average particle size is preferably in the range of 500 μm or less, more preferably in the range of 100 μm or less, and even more preferably in the range of 40 μm or less, and moreover is preferably at least 0.01 μm, and more preferably at least 0.1 μm. The average particle size can be determined as the mass mean value (or median diameter) in particle size distribution measurement by, for example, a laser diffraction method. The shape of the inorganic filler particles is not particularly limited, and may be, for example, spherical, amorphous, needle-like or plate-like.

At a component (E) content of more than 5,000 parts by weight per 100 parts by weight of component (A), the composition becomes highly viscous and may be difficult to handle, in addition to which a uniform composition may not be achieved. Therefore, the content is preferably set in the range of 5,000 parts by weight or less, and more preferably in the range of 2,000 parts by weight or less. When component (E) is included in the composition, the amount thereof is preferably at least 0.1 part by weight, and more preferably at least 1 part by weight.

Other Ingredients

The addition-curable silicone composition of the invention may also include a known platinum family metal catalyst that does not have a microcapsule structure and can be used in addition reactions. Also, an organo(poly)siloxane lacking reactivity, such as methylpolysiloxane, may be included for the purpose of adjusting the elastic modulus and viscosity of the composition. Moreover, to prevent degradation of the addition-curable silicone composition, the composition may also optionally include a known antioxidant, such as 2,6-di-tert-butyl-4-methylphenol. Adhesive modifiers, surfactants, mold parting agents, dyes, pigments, flame retardants, anti-settling agents, thixotropy modifiers and the like may also be optionally included.

Next, methods for preparing the addition-curable silicone composition of the invention are described, although the invention is not limited to these.

Methods for preparing the addition-curable silicone composition of the invention are not particularly limited, so long as they accord with methods for preparing conventional addition-curable silicone compositions. For example, use can be made of a method that mixes together components (A) to (C) and, in addition to this where necessary, components (D), (E) and other ingredients using a mixer such as the THINKY MIXER (a registered trademark of Thinky KK), the Trimix, Twinmix or Planetary Mixer (all registered trademarks of mixers manufactured by Inoue Mfg., Inc.), the Ultra Mixer (registered trademark of mixers manufactured by Mizuho Industrial Co., Ltd.) or the HIVIS DISPER MIX (registered trademark of mixers manufactured by Tokushu Kika Kogyo KK), or by manual mixing using a paddle or the like.

The addition-curable silicone composition of the invention has a viscosity measured at 25° C. of from 0.1 to 1,000 Pa·s, preferably from 1 to 500 Pa·s, and more preferably from 5 to 300 Pa·s. At a viscosity below 0.1 Pa·s, shape retention becomes difficult and the workability may worsen in other respects as well. At a viscosity greater than 1,000 Pa·s, discharge and coating become difficult and the workability may worsen in other respects as well. This viscosity can be obtained by adjusting the manner in which the various above ingredients are compounded. In this invention, the viscosity is a value measured at 25° C. with a Malcolm viscometer (10 rpm with rotor A; shear rate, 6 s$^{-1}$).

As with ordinary, prior-art, addition-curable silicone compositions, the addition-curable silicone composition of the invention can be advantageously used in a wide range of applications. In environments where exposure to very high temperatures in excess of 200° C. occurs, it is particularly effective for the purposes of preventing the silicone composition from curing prior to the proper curing step and preventing deactivation of the hydrosilylation catalyst.

When the addition-curable silicone composition of the invention is cured, the curing conditions are not particularly limited, although the temperature is generally from 25 to 200° C., preferably from 60 to 180° C., and more preferably from 80 to 170° C., and the time is generally from 10 minutes to 24 hours, preferably from 30 minutes to 12 hours, and more preferably from 1 to 6 hours. The addition-curable silicone composition after curing is not particularly limited as to its properties and condition and may be, for example, in the form of a gel, a low-hardness rubber or a high-hardness rubber.

EXAMPLES

The invention is illustrated more fully below by way of Examples and Comparative Examples, although the invention is not limited by these Examples. The kinematic viscosities shown are values measured at 25° C. with an Ubbelohde-type Ostwald viscometer. The following various ingredients were furnished for preparing the addition-curable silicone composition of the invention.

Component (A)

A-1: A dimethylpolysiloxane in which both ends are capped with dimethylvinylsilyl groups, and which has a kinematic viscosity at 25° C. of 600 mm$^2$/s Component (B)

B-1: An organohydrogenpolysiloxane of formula (3) below which has a kinematic viscosity at 25° C. of 25 mm$^2$/s

[Chem. 1]

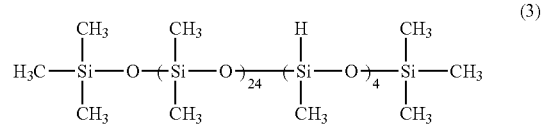

(3)

Component C

C-1: Hydrosilylation catalyst particles obtained in Synthesis Example 1 below

Synthesis Example 1

Preparation of Component C-1

An oil-in-oil (O/O) emulsion was prepared by adding the following to a 25 nit, glass bottle and shaking vigorously: 10.5 g of 1,6-hexanediol dimethacrylate (C″) (solubility parameter=9.22), 4.5 g of a solution of a platinum-divinyltetramethyldisiloxane complex dissolved in the same dimethylpolysiloxane (C′) (solubility parameter=7.38) as component (A-1) above (platinum atom content of solution: 1 wt % as platinum atoms), and 0.105 g of diphenyl(2,4,6-trimethylbenzoyl)phosphine oxide. An oil-in-oil-in-water O/O)/W) emulsion was subsequently prepared by adding the earlier prepared O/O emulsion to 135 g of a 2 wt % aqueous solution of polyvinyl alcohol measured into a 300 mL polypropylene cup while stirring with a homogenizing mixer set to a speed of 1,400 rpm, and then setting the rotational speed to 3,000 rpm and stirring at room temperature for one hour under light shielding. Next, the resulting (O/O)/W emulsion was irradiated for one hour with ultraviolet light from a UV LED having a wavelength of 365 nm. This was shielded from light and left at rest for 24 hours, following Which the supernatant was decanted off and the precipitate was subjected to successive washing/centrifugal separation with deionized water, deionized water/ethanol=50/50 (weight ratio), ethanol, ethanol/toluene=50/50 (weight ratio) and toluene, after Which freeze drying was carried out for 3 hours, giving 8.7 g (yield=58%) of hydrosilylation catalyst particles in the form of a white powder. The platinum atom content, as determined with an ICP-OES (Agilent 730, from Agilent Industries, Inc.), was 0.306 wt % and the average particle size, as measured with a laser diffraction/scattering type particle size analyzer (LA-750, from Horiba, Ltd.), was 14.7 μm.

C-2: Hydrosilylation catalyst particles obtained in Synthesis Example 2 below

Synthesis Example 2

Preparation of Component C-2

An O/O emulsion was prepared by adding the following to a 25 mL glass bottle and shaking vigorously: 10.5 g of trimethylolpropane trimethacrylate (C") (solubility parameter=9.40), 4.5 g of a solution of a platinum-divinyltetramethyldisiloxane complex dissolved in the same dimethylpolysiloxane (C') (solubility parameter=7.38) as component (A-1) above (platinum atom content of solution: 1 wt % as platinum atoms), and 0.105 g of diphenyl(2,4,6-trimethylbenzoyl)phosphine oxide. An (O/O)/W emulsion was subsequently prepared by adding the earlier prepared O/O emulsion to 135 g of a 2 wt % aqueous solution of polyvinyl alcohol measured into a 300 mL polypropylene cup while stirring with a homogenizing mixer set to a speed of 1,400 rpm, and then setting the rotational speed to 3,000 rpm and stirring at room temperature for one hour under light shielding. Next, the resulting (O/O)/W emulsion was irradiated for one hour with ultraviolet light from a UV LED having a wavelength of 365 nm. This was shielded from light and left at rest for 24 hours, following which the supernatant was decanted off and the precipitate was subjected to successive washing/centrifugal separation with deionized water, deionized water/ethanol=50/50 (weight ratio), ethanol, ethanol/toluene=50/50 (weight ratio) and toluene, after which freeze drying was carried out for 3 hours, giving 7.0 g (yield=46%) of hydrosilylation catalyst particles in the form of a white powder. The platinum atom content, as determined with an ICP-OES (Agilent 730, from Agilent Industries, Inc.), was 0.280 wt % and the average particle size, as measured with a laser diffraction/scattering type particle size analyzer (LA-750, from Horiba, Ltd.), was 18.4 μm.

C-3: Hydrosilylation catalyst particles obtained in Synthesis Example 3 below

Synthesis Example 3

Preparation of Component C-3

An O/O emulsion was prepared by adding the following to a 25 mL glass bottle and shaking vigorously: 10.5 g of triethylene glycol dimethacrylate (C") (solubility parameter=9.72), 4.5 g of a solution of a platinum-divinyltetramethyldisiloxane complex dissolved in the same dimethylpolysiloxane (C') (solubility parameter=7.38) as component (A-1) above (platinum atom content of solution: 1 wt % as platinum atoms), and 0.105 g of diphenyl(2,4,6-trimethylbenzoyl)phosphine oxide. An (O/O)/W emulsion was subsequently prepared by adding the earlier prepared O/O emulsion to 135 g of a 2 wt % aqueous solution of polyvinyl alcohol measured into a 300 mL polypropylene cup while stirring with a homogenizing mixer set to a speed of 1,400 rpm, and then setting the rotational speed to 3,000 rpm and stirring at room temperature for one hour under light shielding. Next, the resulting (O/O)/W emulsion was irradiated for one hour with ultraviolet light from a UV LED having a wavelength of 365 nm. This was shielded from light and left at rest for 24 hours, following which the supernatant was decanted off and the precipitate was subjected to successive washing/centrifugal separation with deionized water, deionized water/ethanol=50/50 (weight ratio), ethanol, ethanol/toluene=50/50 (weight ratio) and toluene, after which freeze drying was carried out for 3 hours, giving 7.1 g (yield=47%) of hydrosilylation catalyst particles in the form of a white powder. The platinum atom content, as determined with an ICP-OES (Agilent 730, from Agilent Industries, Inc.), was 0.275 wt % and the average particle size, as measured with a laser diffraction/scattering type particle size analyzer (LA-750, from Horiba, Ltd.), was 5.4 μm.

C-4: Hydrosilylation catalyst particles obtained in Synthesis Example 4 below

Synthesis Example 4

Preparation of Component C-4

An O/O emulsion was prepared by adding the following to a 25 mL glass bottle and shaking vigorously: 10.5 g of glycerol dimethacrylate (C") (solubility parameter=10.99), 4.5 g of a solution of a platinum-divinyltetramethyldisiloxane complex dissolved in the same dimethylpolysiloxane (C') (solubility parameter=7.38) as component (A-1) above (platinum atom content of solution: 1 wt % as platinum atoms), and 0.105 g of diphenyl(2,4,6-trimethylbenzoyl) phosphine oxide. An (O/O)/W emulsion was subsequently prepared by adding the earlier prepared O/O emulsion to 135 g of a 2 wt % aqueous solution of polyvinyl alcohol measured into a 300 mL polypropylene cup while stirring with a homogenizing mixer set to a speed of 1,400 rpm, and then setting the rotational speed to 3,000 rpm and stirring at room temperature for one hour under light shielding. Next, the resulting (O/O)/W emulsion was irradiated for one hour with ultraviolet light from a UV LED having a wavelength of 365 nm. This was shielded from light and left at rest for 24 hours, following which the supernatant was decanted off and the precipitate was subjected to successive washing/ centrifugal separation with deionized water, deionized water/ethanol=50/50 (weight ratio), ethanol, ethanol/toluene=50/50 (weight ratio) and toluene, after which freeze drying was carried out for 3 hours, giving 7.0 g (yield=46%) of hydrosilylation catalyst particles in the form of a white powder. The platinum atom content, as determined with an ICP-OES (Agilent 730, from Agilent Industries, Inc.), was 0.306 wt % and the average particle size, as measured with a laser diffraction/scattering type particle size analyzer (LA-750, from Horiba, Ltd.), was 10.7 μm.

C-5: Hydrosilylation catalyst particles obtained in Synthesis Example 5 below

Synthesis Example 5

Preparation of Component C-5

An O/O emulsion was prepared by adding the following to a 25 mL glass bottle and shaking vigorously: 10.5 g of 1,6-hexanediol dimethacrylate (C") (solubility parameter=9.59), 4.5 g of a solution of a platinum-divinyltetramethyldisiloxane complex dissolved in the same dimethylpolysiloxane (C') (solubility parameter=7.38) as component (A-1) above (platinum atom content of solution: 1 wt % as platinum atoms), and 0.105 g of diphenyl(2,4,6-trimethylbenzoyl)phosphine oxide. An (O/O)/W emulsion was subsequently prepared by adding the earlier prepared O/O emulsion to 135 g of a 2 wt % aqueous solution of polyvinyl alcohol measured into a 300 mL polypropylene cup while stirring with a homogenizing mixer set to a speed of 1,400 rpm, and then setting the rotational speed to 3,000 rpm and stirring at room temperature for one hour under light shielding. Next, the resulting (O/O)/W emulsion was irradiated for one hour with ultraviolet light from a UV LED having a wavelength of 365 nm. This was shielded from light and left at rest for 24 hours, following which the supernatant was decanted off and the precipitate was subjected to successive washing/centrifugal separation with deionized water, deionized water/ethanol=50/50 (weight ratio), ethanol, ethanol/toluene=50/50 (weight ratio) and toluene, after which freeze drying was carried out for 3 hours, giving 8.7 g (yield=58%) of hydrosilylation catalyst particles in the form of a white powder. The platinum atom content, as determined with an ICP-OES (Agilent 730, from Agilent Industries, Inc.), was 0.342 wt % and the average particle size, as measured with a laser diffraction/scattering type particle size analyzer (LA-750, from Horiba, Ltd.), was 11.7 µm.

C-6: Hydrosilylation catalyst particles obtained in Synthesis Example 6 below

Synthesis Example 6

Preparation of Component C-6

An O/O emulsion was prepared by adding the following to a 25 mL glass bottle and shaking vigorously: 10.5 g of trimethylolpropane triacrylate (C") (solubility parameter=9.94), 4.5 g of a solution of a platinum-divinyltetramethyldisiloxane complex dissolved in the same dimethylpolysiloxane (C') (solubility parameter=7.38) as component (A-1) above (platinum atom content of solution: 1 wt % as platinum atoms), and 0.105 g of diphenyl(2,4,6-trimethylbenzoyl)phosphine oxide. An (O/O)/W emulsion was subsequently prepared by adding the earlier prepared O/O emulsion to 135 g of a 2 wt % aqueous solution of polyvinyl alcohol measured into a 300 mL polypropylene cup while stirring with a homogenizing mixer set to a speed of 1,400 rpm, and then setting the rotational speed to 3,000 rpm and stirring at room temperature for one hour under light shielding. Next, the resulting (O/O)/W emulsion was irradiated for one hour with ultraviolet light from a UV LED having a wavelength of 365 nm. This was shielded from light and left at rest for 24 hours, following which the supernatant was decanted off and the precipitate was subjected to successive washing/centrifugal separation with deionized water, deionized water/ethanol=50/50 (weight ratio), ethanol, ethanol/toluene=50/50 (weight ratio) and toluene, after which freeze drying was carried out for 3 hours, giving 7.5 g (yield=50%) of hydrosilylation catalyst particles in the form of a white powder. The platinum atom content, as determined with an ICP-OES (Agilent 730, from Agilent Industries, Inc.) was 0.330 wt % and the average particle size, as measured with a laser diffraction/scattering type particle size analyzer (LA-750, from Horiba, Ltd.), was 26.0 µm.

C-7: Hydrosilylation catalyst particles obtained in Synthesis Example 7 below

Synthesis Example 7

Preparation of Component C-7

An O/O emulsion was prepared by adding the following to a 25 mL glass bottle and shaking vigorously: 10.5 g of the compound of formula (4) below (C") (solubility parameter=7.75), 4.5 g of a solution of a platinum-divinyltetramethyldisiloxane complex dissolved in the same dimethylpolysiloxane (C') (solubility parameter=7.38) as component (A-1) above (platinum atom content of solution: 1 wt % as platinum atoms), and 0.105 g of diphenyl(2,4,6-trimethylbenzoyl)phosphine oxide. An (O/O)/W emulsion was subsequently prepared by adding the earlier prepared O/O emulsion to 135 g of a 2 wt % aqueous solution of polyvinyl alcohol measured into a 300 mL polypropylene cup while stirring with a homogenizing mixer set to a speed of 1,400 rpm, and then setting the rotational speed to 3,000 rpm and stirring at room temperature for one hour under light shielding. Next, the resulting (O/O)/W emulsion was irradiated for one hour with ultraviolet light from a UV LED having a wavelength of 365 nm. This was shielded from light and left at rest for 24 hours, following which the supernatant was decanted off and the precipitate was subjected to successive washing/centrifugal separation with deionized water, deionized water/ethanol=50/50 (weight ratio), ethanol, ethanol/toluene=50/50 (weight ratio) and toluene, after which freeze drying was carried out for 3 hours, giving 6.7 g (yield=44%) of hydrosilylation catalyst particles in the form of a white powder. The platinum atom content, as determined with an ICP-OES (Agilent 730, from Agilent Industries, Inc.), was 0.114 wt % and the average particle size, as measured with a laser diffraction/scattering type particle size analyzer (LA-750, from Horiba, Ltd.), was 61.1 µm.

[Chem. 2]

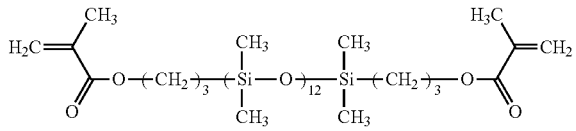

(4)

C-8: Hydrosilylation catalyst particles obtained in Synthesis Example 8 below

Synthesis Example 8

Preparation of Component C-8

An O/O emulsion was prepared by adding the following to a 25 mL glass bottle and shaking vigorously: 10.5 g of the compound of formula (5) below (C") (solubility parameter=7.44). 4.5 g of a solution of a platinum-divinyltetramethyldisiloxane complex dissolved in the same dimethylpolysiloxane (C') (solubility parameter=7.38) as component (A-1) above (platinum atom content of solution: 1 wt % as platinum atoms), and 0.105 g of diphenyl(2,4,6-trimethylbenzoyl)phosphine oxide. An (O/O)/W emulsion was subsequently prepared by adding the earlier prepared O/O emulsion to 135 g of a 2 wt % aqueous solution of polyvinyl alcohol measured into a 300 mL polypropylene cup while stirring with a homogenizing mixer set to a speed of 1,400 rpm, and then setting the rotational speed to 3,000 rpm and stirring at room temperature for one hour under light shielding. Next, the resulting (O/O)/W emulsion was irradiated for one hour with Ultraviolet light from a UV LED having a wavelength of 365 nm. This was shielded from light and left at rest for 24 hours, following which the supernatant was decanted off and the precipitate was subjected to successive washing/centrifugal separation with deionized water, deionized water/ethanol=50/50 (weight ratio), ethanol, ethanol/toluene=50/50 (weight ratio) and toluene, after which freeze drying was carried out for 3 hours, giving 5.7 g (yield=38%) of hydrosilylation catalyst particles in the form of a white powder. The platinum atom content, as determined with an ICP-OES (Agilent 730, from Agilent Industries, Inc.) was 0.091 wt % and the average particle size, as measured with a laser diffraction/scattering type particle size analyzer (LA-750, from Horiba, Ltd.), was 87.0 μm.

[Chem. 3]

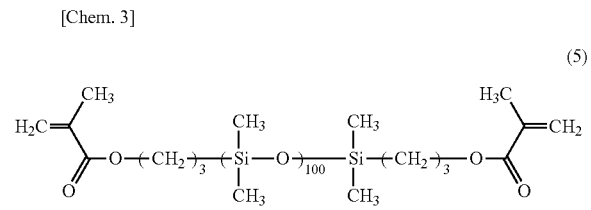

(5)

C-9: Hydrosilylation catalyst particles obtained in Synthesis Example 9 below

Synthesis Example 9

Preparation of Component C-9

A solution was prepared by dissolving 105 g of the silicone resin compound of compositional formula (6) below (C") (solubility parameter=8.28) and 45 g of a solution of a platinum-divinyltetramethyldisiloxane complex dissolved in toluene (C') (solubility parameter=8.81) (platinum atom content: 1 wt % as platinum atoms) in 300 g of toluene. This was dried with a Mini Spray Dryer (B-290, from Buchi Corporation) having an inlet temperature set to 150° C. and a nozzle particle diameter set to 700 μm, thereby giving 72 g (yield=68%) of hydrosilylation catalyst particles in the form of a white powder. In platinum atom content, as determined with an ICP-OES (Agilent 730, from Agilent Industries, Inc.), was 0.409 wt % and the average particle size, as measured with a laser diffraction/scattering type particle size analyzer (LA-750, from Horiba, Ltd.), was 4.3 μm.

(6)

(wherein $T^{Ph}$ represents $(C_6H_5)SiO\equiv$ and $D^{Vi}$ represents $—Si(CH=CH_2)(CH_3)O—$; molecular weight=2,400; softening point=165° C.)

C-10: A solution of a platinum-divinyltetramethyldisiloxane complex dissolved in the same dimethylpolysiloxane as A-1 above (platinum atom content of solution: 1 wt % as platinum atoms)

The properties of components C-1 to C-10 thus furnished are summarized in Table 2 below.

TABLE 2

| | Solubility parameter of (C") | Solubility parameter of (C') | [Solubility parameter of (C")] − [Solubility parameter of (C')] | Platinum atom content (wt %) | Average particle size (μm) |
|---|---|---|---|---|---|
| C-1 | 9.22 | 7.38 | 1.84 | 0.306 | 14.7 |
| C-2 | 9.40 | 7.38 | 2.02 | 0.280 | 18.4 |
| C-3 | 9.72 | 7.38 | 2.34 | 0.275 | 5.4 |
| C-4 | 10.99 | 7.38 | 3.61 | 0.306 | 10.7 |
| C-5 | 9.59 | 7.38 | 2.21 | 0.342 | 11.7 |
| C-6 | 9.94 | 7.38 | 2.56 | 0.330 | 26.0 |
| C-7 | 7.75 | 7.38 | 0.37 | 0.114 | 61.1 |
| C-8 | 7.44 | 7.38 | 0.06 | 0.091 | 87.0 |
| C-9 | 8.28 | 8.81 | −0.53 | 0.409 | 4.3 |
| C-10 | does not have a microcapsule structure | | | | |

Component (D)
D-1: The compound of formula (7) below

[Chem. 4]

(7)

Component (E)
E-1: Aluminum powder having an average particle size of 10.0 μm (thermal conductivity: 237 W/m·K)
E-2: Crystalline silica powder having an average particle s of 1.5 μm (thermal conductivity: 10 W/m·K)
Other Components
Component (F)
F-1: The polysiloxane of formula (8) below

[Chem. 5]

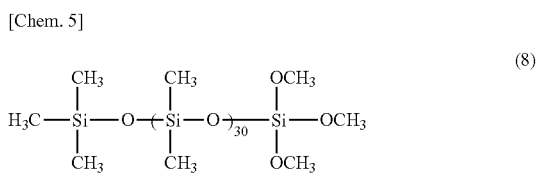

(8)

Component (G)
G-1: A dimethylpolysiloxane capped at both ends with trimethylsilyl groups and having a kinematic viscosity at 25° C. of 100 mm²/s Working Examples 1 to 6, Comparative Examples 1 to 4

Preparation of Addition-Curable Silicone Compositions
Heat-conductive addition-curable silicone compositions were prepared by using the following method to blend together components (A) to (G) in the amounts shown in Tables 3 and 4 below. The SiH/SiVi ratio is the ratio of the total number of SiH groups in component (B) to the total number of alkenyl groups in component (A).

Components (A), (E), (F) and (G) were added to a 5-liter planetary mixer (Inoue Mfg., Inc.) and mixed at 170° C. for 1 hour. The mixture was cooled to 40° C. or below, following which components (C), (D) and (B) were added and mixed to uniformity, thereby preparing the addition-curable silicone composition.

The viscosities and thermal conductivities were measured and the curabilities and catalytic activities were evaluated in accordance with the following methods for each of the compositions obtained as described above. The results are presented in Tables 3 and 4.

[Viscosity]

The absolute viscosity of each composition was measured at 25° C. using a type PC-1T Malcolm viscometer (10 rpm with rotor A; shear rate, 6 s$^{-1}$).

[Thermal Conductivity]

Each composition was wrapped in kitchen wrap, and the thermal conductivity was measured with the TPS-2500S from Kyoto Electronics Manufacturing Co., Ltd.

[Curability Test]

The uncured addition-curable silicone composition was coated to a thickness of 2 mm between two parallel plates having a diameter of 2.5 cm. The temperature of the coated plates was raised from 25° C. to 125° C. at a rate of 10° C./min, from 125° C. to 145° C. at a rate of 2° C./min, and from 145° C. to 150° C. at a rate of 0.5° C./min, following which the temperature was held at 150° C. until the storage modulus G' of the addition-curable silicone composition saturates, and the time t10 at which the storage modulus G' reached 10% of the value at saturation was read off. The larger this t10 value, the slower the rate of cure; in other words, it can be concluded that there is a high preventive effect against curing of the silicone composition prior to the proper curing step when the composition is exposed to a very high temperature. A rheometer (type RDA III, from Rheometric Scientific F.E. Ltd.) was used for measurement.

[Catalytic Activity Test]

The uncured addition-curable silicone composition was filled into an aluminum vessel and heat cured for the period of time until the storage modulus G' at 150° C. saturates, as determined in the above-described curability test, whereupon about 10 mg of the composition was sampled. In addition, the uncured addition-curable silicone composition was filled into an aluminum vessel, the temperature was raised from 25° C. to 260° C. at a rate of 30° C./min (Step α), and about 10 mg of the composition was similarly sampled. Next, the composition was heated in an 150° C. oven for, as determined in the curability test, the period of time until the storage modulus G' at 150° C. saturates (Step β, and about 10 mg of the composition was similarly sampled. The respective sampled compositions and two microspatulas of potassium hydroxide powder were mixed together and then heated at 120° C. for one hour, and the ethane gas and ethylene gas that evolved were quantitatively determined by gas chromatography, based on which the degree of conversion for the addition reaction was computed from formula (9) below.

Degree of conversion (%)=(moles of ethane gas)/
(moles of ethane gas+moles of ethylene gas)×
100     (9)

In Tables 3 and 4 below, values obtained by normalizing to 100% the degree of conversion for a composition heated for the period of time until the storage modulus G' at 150° C. saturates are used.

In cases where there is no apparent difference in the degrees of conversion at the Step α and Step β stages above, it is concluded that the hydrosilylation catalyst was deactivated from exposure to a very high temperature in Step α. On the other hand, in cases where the degree of conversion increased from Step α to Step β, it can be concluded that the hydrosilylation catalyst retains its activity even when exposed to a very high temperature in Step α.

TABLE 3

| | | Example | | | | | |
|---|---|---|---|---|---|---|---|
| | | 1 | 2 | 3 | 4 | 5 | 6 |
| Composition | A-1 | 100 | 100 | 100 | 100 | 100 | 100 |
| (pbw) | B-1 | 7.9 | 7.9 | 7.9 | 7.9 | 7.9 | 7.9 |
| | C-1 | 0.43 | | | | | |
| | C-2 | | 0.43 | | | | |
| | C-3 | | | 0.43 | | | |
| | C-4 | | | | 0.43 | | |
| | C-5 | | | | | 0.43 | |
| | C-6 | | | | | | 0.43 |
| | D-1 | 0.52 | 0.52 | 0.52 | 0.52 | 0.52 | 0.52 |
| | E-1 | 1,600 | 1,600 | 1,600 | 1,600 | 1,600 | 1,600 |
| | E-2 | 92 | 92 | 92 | 92 | 92 | 92 |
| | F-1 | 100 | 100 | 100 | 100 | 100 | 100 |
| | G-1 | 40 | 40 | 40 | 40 | 40 | 40 |
| | SiH/SiVi ratio | 1.0 | 1.0 | 1.0 | 1.0 | 1.0 | 1.0 |
| Test results | Viscosity (Pa · s) | 30 | 32 | 28 | 29 | 29 | 32 |
| | Thermal conductivity (W/m · K) | 2.9 | 2.9 | 2.9 | 3.0 | 3.0 | 2.9 |
| | Curability test (t10, s) | 4,905 | 5,668 | 11,700 | 19,120 | 5,784 | 8,351 |
| | Catalytic activity test: (degree of conversion (%) in Step α) | 81 | 76 | 64 | 51 | 80 | 71 |
| | Catalytic activity test: (degree of conversion (%) in Step β) | 97 | 97 | 94 | 90 | 98 | 95 |
| | Catalytic activity test: (degree of conversion (%) in Step β) − (degree of conversion (%) in Step α) | 16 | 21 | 30 | 39 | 18 | 24 |

TABLE 4

|  |  | Comparative Example | | | |
|---|---|---|---|---|---|
|  |  | 1 | 2 | 3 | 4 |
| Composition (pbw) | A-1 | 100 | 100 | 100 | 100 |
|  | B-1 | 7.9 | 7.9 | 7.9 | 7.9 |
|  | C-7 | 1.13 |  |  |  |
|  | C-8 |  | 1.41 |  |  |
|  | C-9 |  |  | 0.43 |  |
|  | C-10 |  |  |  | 0.13 |
|  | D-1 | 0.52 | 0.52 | 0.52 | 0.52 |
|  | E-1 | 1,600 | 1,600 | 1,600 | 1,600 |
|  | E-2 | 92 | 92 | 92 | 92 |
|  | F-1 | 100 | 100 | 100 | 100 |
|  | G-1 | 40 | 40 | 40 | 40 |
|  | SiH/SiVi ratio | 1.0 | 1.0 | 1.0 | 1.0 |
| Test results | Viscosity (Pa · s) | 36 | 38 | 32 | 30 |
|  | Thermal conductivity (W/m · K) | 3.0 | 2.9 | 3.0 | 3.0 |
|  | Curability test (t10, s) | 1,801 | 1,722 | 2,109 | 2,006 |
|  | Catalytic activity test: (degree of conversion (%) in Step α) | 76 | 81 | 74 | 82 |
|  | Catalytic activity test: (degree of conversion (%) in Step β) | 79 | 82 | 75 | 82 |
|  | Catalytic activity test: (degree of conversion (%) in Step β) − (degree of conversion (%) in Step α) | 3 | 1 | 1 | 0 |

From the results in Tables 3 and 4, in Working Examples 1 to 6 which satisfy the conditions of the invention, the t10 value was large, i.e., the rate of cure was slow, meaning that there was a high preventive effect against curing of the silicone composition prior to the proper curing step when the composition was exposed to a very high temperature. Also, the degree of conversion in the addition reaction increased from Step α to Step β, and so it can be concluded that in Step α, the activity of the hydrosilylation catalyst is retained even under exposure to a very high temperature of 260° C.

On the other hand, in Comparative Examples 1 to 4, the t10 value was small, i.e., the rate of cure was rapid, meaning that the silicone composition ended up curing prior to the proper curing step when exposed to a very high temperature. Also, substantially no increase in the degree of conversion is apparent from Step α to Step β, from which it is concluded that the hydrosilylation catalyst was deactivated upon exposure to the very high temperature of 260° C. in Step α.

Accordingly, it was confirmed that by employing hydrosilylation catalyst particles having a specific microcapsule structure, the addition-curable silicone compositions of the invention, when exposed to very high temperatures in excess of 200° C., can prevent curing of the silicone composition prior to the proper curing step and at the same time can maintain the activity of the hydrosilylation catalyst.

The invention is not limited to the embodiments described above, which are presented here for the purpose of illustration. Any embodiments having substantially the same constitution as the technical ideas set forth in the claims and exhibiting similar actions and effects fall within the technical scope of the invention.

The invention claimed is:

1. An addition-curable silicone composition comprising, as essential ingredients:
   (A) an organopolysiloxane having at least two aliphatic unsaturated hydrocarbon groups per molecule and a kinematic viscosity at 25° C. of from 60 to 100,000 mm$^2$/s;
   (B) an organohydrogenpolysiloxane having at least two silicon-bonded hydrogen atoms (SiH groups) per molecule, in an amount such that the ratio of the number of SiH groups to the total number of aliphatic unsaturated hydrocarbon groups in component (A) is from 0.5 to 5; and
   (C) an effective amount of hydrosilylation catalyst particles that have a microcapsule structure in which a platinum family metal catalyst-containing organic compound or polymeric compound (C') serves as a core material and a three-dimensional crosslinked polymeric compound obtained by polymerizing at least one type of polyfunctional monomer (C'') serves as a wall material and for which [the solubility parameter of (C'')] − [the solubility parameter of (C')] is 1.0 or more, wherein the polyfunctional monomer (C'') in component (C) is a polyfunctional monomer having two or more polymerizable carbon-carbon double bonds per molecule.

2. The addition-curable silicone composition of claim 1, wherein component (C) has an average particle size of from 0.01 to 1,000 μm.

3. The addition-curable silicone composition of claim 1, wherein the polyfunctional monomer (C'') in component (C) is a polyfunctional monomer having two or more (meth)acrylic groups per molecule.

4. The addition-curable silicone composition of claim 1, further comprising:
   (D) an effective amount of one or more addition curing reaction regulator selected from the group consisting of acetylene compounds, nitrogen compounds, organophosphorus compounds, oxime compounds and organochloro compounds.

5. The addition-curable silicone composition of claim 1, further comprising:
   (E) from 0.1 to 5,000 parts by weight, per 100 parts by weight of component (A), of at least one inorganic filler selected from the group consisting of metals, metal oxides, metal hydroxides, metal nitrides, metal carbides and carbon allotropes.

* * * * *